United States Patent
Mao et al.

(10) Patent No.: US 11,973,424 B2
(45) Date of Patent: Apr. 30, 2024

(54) SPUR FREE SWITCHING REGULATOR WITH SELF-ADAPTIVE CANCELLATION OF COIL CURRENT RIPPLE

(71) Applicant: Analog Devices International Unlimited Company, Limerick (IE)

(72) Inventors: Jingwen Mao, Shanghai (CN); Zhijie Zhu, Shanghai (CN)

(73) Assignee: Analog Devices International Unlimited Company, Limerick (IE)

( * ) Notice: Subject to any disclaimer, the term of this patent is extended or adjusted under 35 U.S.C. 154(b) by 218 days.

(21) Appl. No.: 17/466,839

(22) Filed: Sep. 3, 2021

(65) Prior Publication Data

US 2022/0077779 A1    Mar. 10, 2022

Related U.S. Application Data

(60) Provisional application No. 63/075,676, filed on Sep. 8, 2020.

(51) Int. Cl.
| | | |
|---|---|---|
| *H02M 3/158* | (2006.01) | |
| *H02M 1/00* | (2006.01) | |
| *H02M 1/14* | (2006.01) | |
| *H02M 1/15* | (2006.01) | |

(52) U.S. Cl.
CPC ......... *H02M 3/158* (2013.01); *H02M 1/0009* (2021.05); *H02M 1/14* (2013.01); *H02M 1/15* (2013.01)

(58) Field of Classification Search
CPC ........ H02M 3/158; H02M 3/156; H02M 1/14; H02M 1/15; H02M 1/0009
See application file for complete search history.

(56) References Cited

U.S. PATENT DOCUMENTS

| | | | |
|---|---|---|---|
| 5,668,464 A | * | 9/1997 | Krein ...................... H02M 1/14 363/46 |
| 5,929,692 A | | 7/1999 | Carsten |
| 6,388,896 B1 | | 5/2002 | Cuk |
| (Continued) | | | |

FOREIGN PATENT DOCUMENTS

| | | |
|---|---|---|
| CN | 1738189 A | 2/2006 |
| CN | 106374741 | 2/2017 |
| (Continued) | | |

OTHER PUBLICATIONS

"Chinese Application Serial No. 202111047470.X, Notification to Make Rectification dated Sep. 24, 2021", 2 pgs.

(Continued)

*Primary Examiner* — Kyle J Moody
*Assistant Examiner* — Jye-June Lee
(74) *Attorney, Agent, or Firm* — Schwegman Lundberg & Woessner, P.A.

(57) ABSTRACT

Described herein is a spur-free technique for a switching regulator. The switching regulator may self-adaptively reduce the spur of the output voltage without affecting performance of the switching frequency, The switching regulator may track a coil current and may use an active feedback loop to adaptively generate an artificial coil current, which tracks an amplitude of the coil current but having opposite phase. The artificial coil current may then be injected into an output node to cancel the coil current ripple.

20 Claims, 5 Drawing Sheets

(56) References Cited

U.S. PATENT DOCUMENTS

| | | | |
|---|---|---|---|
| 6,437,999 | B1 | 8/2002 | Wittenbreder |
| 7,233,130 | B1* | 6/2007 | Kay .............. H02M 1/143 |
| | | | 323/284 |
| 7,514,910 | B2 | 4/2009 | Nishida |
| 7,615,973 | B2 | 11/2009 | Uehara |
| 7,706,161 | B2 | 4/2010 | Quazi |
| 8,145,149 | B2 | 3/2012 | Ramachandran et al. |
| RE43,414 | E | 5/2012 | Walters et al. |
| 8,421,432 | B2 | 4/2013 | Hawkes |
| 8,698,475 | B2 | 4/2014 | Dong et al. |
| 8,786,268 | B2 | 7/2014 | Li et al. |
| 8,786,270 | B2 | 7/2014 | Wu et al. |
| 8,829,876 | B2 | 9/2014 | Michishita et al. |
| 8,922,186 | B2 | 12/2014 | Chen |
| 8,963,519 | B2 | 2/2015 | Zambetti et al. |
| 9,209,690 | B2 | 12/2015 | Srinivasan et al. |
| 9,225,231 | B2 | 12/2015 | Gorisse et al. |
| 9,252,659 | B2 | 2/2016 | Oki |
| 9,484,797 | B2 | 11/2016 | Khlat |
| 9,588,532 | B2 | 3/2017 | Rahimi et al. |
| 9,658,666 | B1 | 5/2017 | Ghayal et al. |
| 9,966,832 | B1 | 5/2018 | Engelhardt et al. |
| 10,298,114 | B1 | 5/2019 | Yazdi et al. |
| 11,742,741 | B2 | 8/2023 | Mao |
| 2009/0128110 | A1 | 5/2009 | Delurio et al. |
| 2011/0316508 | A1 | 12/2011 | Cheng et al. |
| 2013/0106378 | A1 | 5/2013 | Khlat |
| 2013/0234678 | A1 | 9/2013 | Patterson et al. |
| 2014/0070787 | A1 | 3/2014 | Arno |
| 2014/0139198 | A1 | 5/2014 | Manlove et al. |
| 2014/0252973 | A1* | 9/2014 | Liu .............. H02M 1/15 |
| | | | 315/200 R |
| 2014/0266120 | A1 | 9/2014 | Isham |
| 2014/0347027 | A1* | 11/2014 | Jayaraj .............. H02M 1/15 |
| | | | 323/282 |
| 2015/0048811 | A1 | 2/2015 | Fayed et al. |
| 2015/0311787 | A1 | 10/2015 | Maede et al. |
| 2016/0006336 | A1 | 1/2016 | Bennett et al. |
| 2018/0120877 | A1 | 5/2018 | Zhao |
| 2019/0081546 | A1 | 3/2019 | Hsu et al. |
| 2020/0028435 | A1 | 1/2020 | Kim et al. |
| 2020/0083798 | A1* | 3/2020 | Yazdi .............. H02M 1/15 |
| 2020/0186023 | A1* | 6/2020 | Yazdi .............. H02M 1/15 |
| 2021/0296995 | A1 | 9/2021 | Zhang et al. |
| 2022/0077780 | A1 | 3/2022 | Mao |

FOREIGN PATENT DOCUMENTS

| | | |
|---|---|---|
| CN | 109120153 | 1/2019 |
| CN | 114157128 | 3/2022 |
| CN | 114421762 | 4/2022 |
| JP | 4829287 B2 | 9/2011 |
| JP | 2013021790 A | 1/2013 |
| KR | 101310092 B1 | 9/2013 |
| TW | 1613537 B | 2/2018 |
| WO | WO-0186792 A1 | 11/2001 |
| WO | WO-2020053884 A1 | 3/2020 |

OTHER PUBLICATIONS

"U.S. Appl. No. 17/467,001, Non Final Office Action dated Feb. 16, 2023", 18 pgs.

Hafeez, KT, et al., "Hybrid Structured Buck Converter with Ripple Cancellation and Improved Efficiency", 2013 Annual IEEE India Conference (INDICON), (2013), 5 pgs.

Liu, Pang-Jung, et al., "A Spur-Reduction DC-DC Converter With Active Ripple Cancelation Technique", IEEE Journal of Emerging and Selected Topics in Power Electronics, 6(4), (Dec. 2018), 2206-2214.

Nashed, Mina, et al., "Current-Mode Hysteretic Buck Converter With Spur-Free Control for Variable Switching Noise Mitigation", IEEE Transactions on Power Electronics, 33(1), (Jan. 2018), 650-664.

Pakala, Sri Harsh, et al., "A Spread-Spectrum Mode Enabled Ripple-Based Buck Converter Using a Clockless Frequency Control", IEEE Transactions on Circuits and Systems—II: Express Briefs, 66(3), (Mar. 2019), 382-386.

Tao, Chengwu, "Control architectures for spur-free operation in switching power regulators", PhD Diss., Iowa State University, (2011), 135 pgs.

Yang, Zhe, "A Mixed Signal Adaptive Ripple Cancellation Technique for Integrated Buck Converters", MS Thesis, Arizona State University, (Dec. 2016), 50 pgs.

"U.S. Appl. No. 17/467,001, Notice of Allowance dated Jun. 16, 2023", 10 pgs.

"U.S. Appl. No. 17/467,001, Response filed May 16, 2023 to Non Final Office Action dated Feb. 16, 2023", 9 pgs.

"Chinese Application Serial No. 202111047470.X, Office Action mailed Nov. 29, 2023", w Machine English translation, 20 pgs.

Xu, Gang Ke, "Kappa Switching DC-DC Converter with Continuous Input and Output Currents Achieving 86.7% Input Ripple Suppression and 16dB Peak EMI Reduction", IEEE Applied Power Electronics Conference and Exposition (APEC), (Jul. 25, 2020), 5 pgs.

\* cited by examiner

SPUR FREE SWITCHING REGULATOR WITH SELF-ADAPTIVE CANCELLATION OF COIL CURRENT RIPPLE

CLAIMS OF PRIORITY

This patent application claims the benefit, of priority U.S. Provisional Patent Application Ser. No. 63/075,676, titled "SPUR FREE SWITCHING REGULATOR WITH SELF-ADAPTIVE CANCELLATION OF COIL CURRENT RIPPLE," filed on Sep. 8, 2020, which is hereby incorporated by reference herein in its entirety.

TECHNICAL FIELD

The present; disclosure generally relates power management, particularly to switching regulators (also referred to as switched-mode power converters) with ripple attenuation.

BACKGROUND

Switching regulators increase (e.g., boost converter) or decrease (e.g., buck converter) an input voltage from a power source to a desired voltage suitable for connected load devices. For example, switching regulators can include, among other things, two switches that alternatively turn on and off to generate an output voltage at the desired voltage level. The switching occurs at a switching frequency. But this switching can lead to undesirable effects such as producing a ripple in the output voltage. A ripple refers to when the output voltage rises and falls like a waveform (e.g., triangle waveform), instead of maintaining at a steady level.

For switching regulators, the output voltage can have a ripple at the switching frequency, caused by charging/discharging of an output capacitor by the ripple of a coil current. The ripple can lead to energy in the output frequency spectrum (e.g., a high "spur") at the switching frequency, which can be undesirable, especially in more sensitive applications such as RF applications.

BRIEF DESCRIPTION OF THE DRAWINGS

Various ones of the appended drawings merely illustrate example embodiments of the present disclosure and should not be considered as limiting its scope.

DETAILED DESCRIPTION

Accordingly, the present inventors have recognized, among other things, a need for a spur-free technique for a switching regulator. The switching regulator may self-adaptively reduce the spur of the output voltage without affecting performance of the switching frequency. The switching regulator may track a coil current and may use an active feedback loop to adaptively generate an artificial coil current, which tracks an amplitude of the coil current but having opposite phase. The artificial coil current may then be injected into an output node to cancel the coil current ripple.

The document describes a method for ripple attenuation in a switching regulator. The method including: sensing a representation of a coil current of the switching regulator; converting the sensed representation of the coil current to sensed coil voltage representation; generating an artificial coil voltage representation; comparing the sensed coil voltage representation and the artificial coil voltage representation; based on comparing the sensed coil voltage and the artificial coil voltage representations, adjusting the artificial coil voltage representation; converting the adjusted artificial coil voltage representation to an artificial coil current representation; and injecting the artificial coil current representation into an output node of the switching regulator.

The document also describes a ripple attenuation circuit. The circuit includes a current sensor to sense a coil current in a switching regulator, a voltage generator to generate an artificial coil voltage, and a comparator to compare the coil voltage and the artificial voltage. Based on comparing the coil voltage and the artificial voltage, the voltage generator can adjust the artificial coil voltage. The circuit also includes a second converter to convert the adjusted artificial coil voltage to an artificial coil current.

The document further describes a switching regulator. The switching regulator includes a switching converter to convert an input voltage to an output voltage at an output node, the switching converter including a pair of switching devices and an inductor, and a ripple attenuation circuit coupled to the switching converter to inject an artificial coil current into the output node. The ripple attenuation circuit includes a current sensor to sense a coil current in the inductor of the switching converter, a voltage converter to convert the coil current to a coil voltage, a signal generator to generate an artificial coil voltage, and a comparator to compare the coil voltage and the artificial voltage. Based on comparing the coil voltage and the artificial voltage, the signal generator can adjust the artificial coil voltage. The ripple attenuation circuit also includes a current converter to convert the adjusted artificial coil voltage to the artificial coil current.

Figure 1:
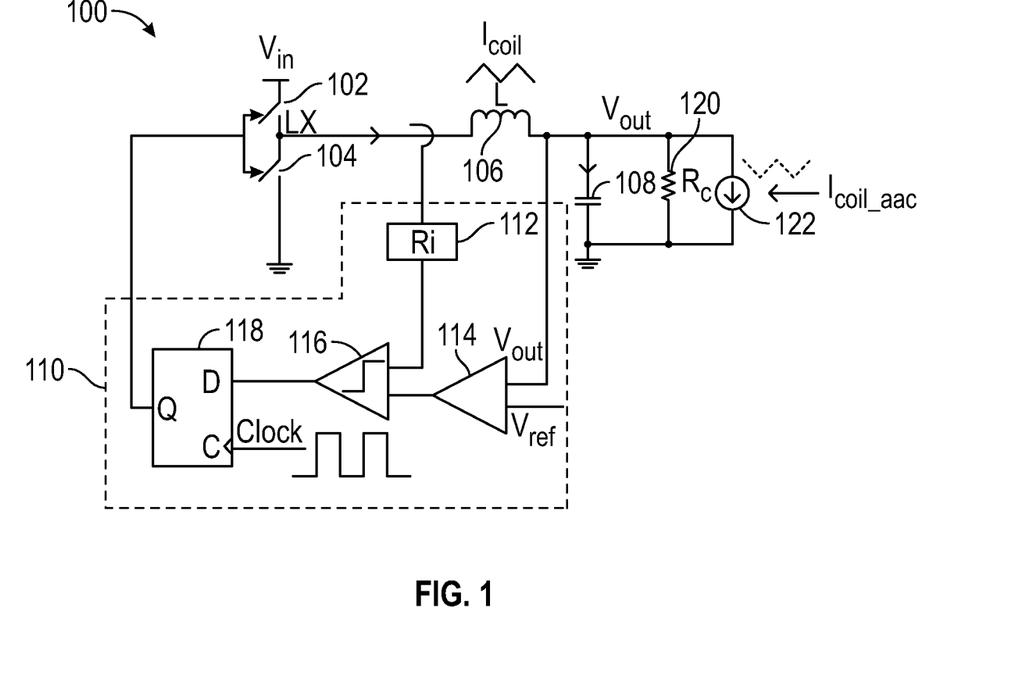
FIG. 1 illustrates example portions of a switching regulator.

FIG. 1 illustrates example portions of a switching regulator 100. The switching regulator 100 may include a pair of switching devices 102, 104, an inductor 106 (L), and a capacitor 108 (Cout). The switching regulator 100 may also include a control circuit 110 to control the switching frequency (e.g., duty cycle) of the switching devices 102, 104. The control circuit 110 may include a resistor 112 (Ri), an error amplifier 114, a comparator 116, and one or more logic circuits 118 (e.g., D flip flop).

The switching devices 102, 104 may be provided as N channel field-effect transistors ("FETs"), as P channel FETs, a metal-oxide-semiconductor FET (MOSFET), or a combination, or the like. Input voltage $V_{IN}$ may be applied to an input terminal of the switching device 112. $V_{IN}$ may be a voltage at the first voltage level. The output of switching device 102 may be coupled to the inductor L 106 and the switching device 104, which may also be coupled to ground. The inductor L 106 may be coupled to the capacitor 108, defining an output node for the output voltage $V_{OUT}$.

The timing of the switching devices 102, 104 may be controlled by the control circuit 110. The control circuit 110 may alternately turn on and off the switching devices 102, 104. For example, the control circuit 110 may output a pulse width modulation signal to control when the switching device 102 turns on and off. The control circuit 110 may invert that pulse width modulation signal so that the switching device 104 is turned on and off at opposite times as switching device 102. In other words, when the switching device 102 is on, the switching device 104 is off and vice versa. The rapid on/off duty cycles of switching devices 102, 104 may be used to control the value of $V_{OUT}$. The switching devices 102, 104 may be provided as a complementary pair of transistor devices, for example the switching device 102 may be provided as a P channel FET while the switching device 104 may be provided as a N channel FET, in which case the control circuit 110 may not need invert the control signal to alternate the timing of the switching devices.

The control circuit 110 may be coupled to the ends of the inductor L 106. The error amplifier 114 may amplify $V_{OUT}$, using a reference voltage $V_{REF}$. The output of the error amplifier 114 may he coupled to the comparator 116, which may also be coupled to the resistor Ri 112. The output of the comparator 116 may be provided as an input to the logic gate 118. Based on this input and a clock signal, the logic gate 118 may generate one or more control signals to control the duty cycles of the switching devices 102, 104.

The switching devices 102, 104 may generate waveform Lx (e.g., a square waveform) and may be coupled to the inductor L 106. A coil current Icoil may flow through the inductor L 106. The inductor L 106 may be coupled to the capacitor (Cout) 108, defining an output node for the output voltage $V_{OUT}$.

Figure 2:
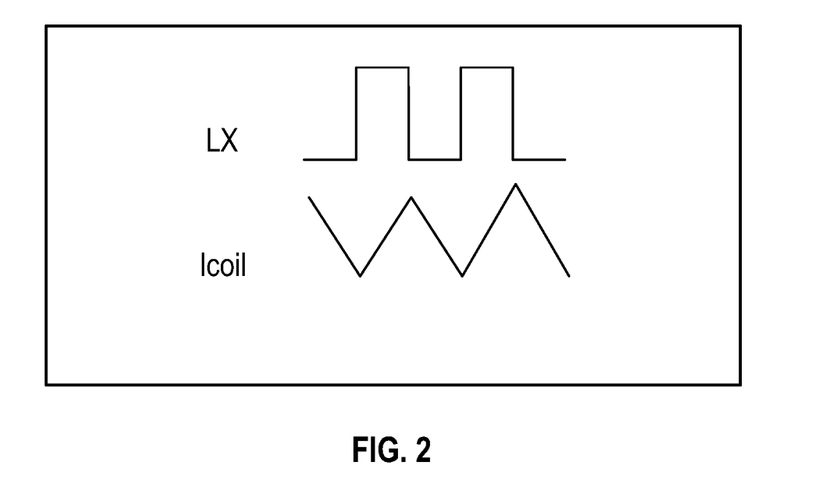
FIG. 2 illustrates example waveforms associated with a switching regulator.

FIG. 2 illustrates example waveforms of Lx and Icoil. As discussed above, the coil current Icoil may generate ripples in the output voltage $V_{OUT}$.

Returning to FIG. 1, the switching regulator 100 may also include another resistor (Rc) 120 coupled to the output node and a current source 122. The current source 122 may generate an artificial coil current (Icoil_aac). The artificial coil current Icoil_aac may track the amplitude of the coil current Icoil, but may be out of phase, e.g., 180 degrees out of phase. The artificial coil current may be injected into the output node (where $V_{OUT}$ is generated) so that it can attenuate or even cancel the ripple in the output voltage $V_{OUT}$.

Figure 3:
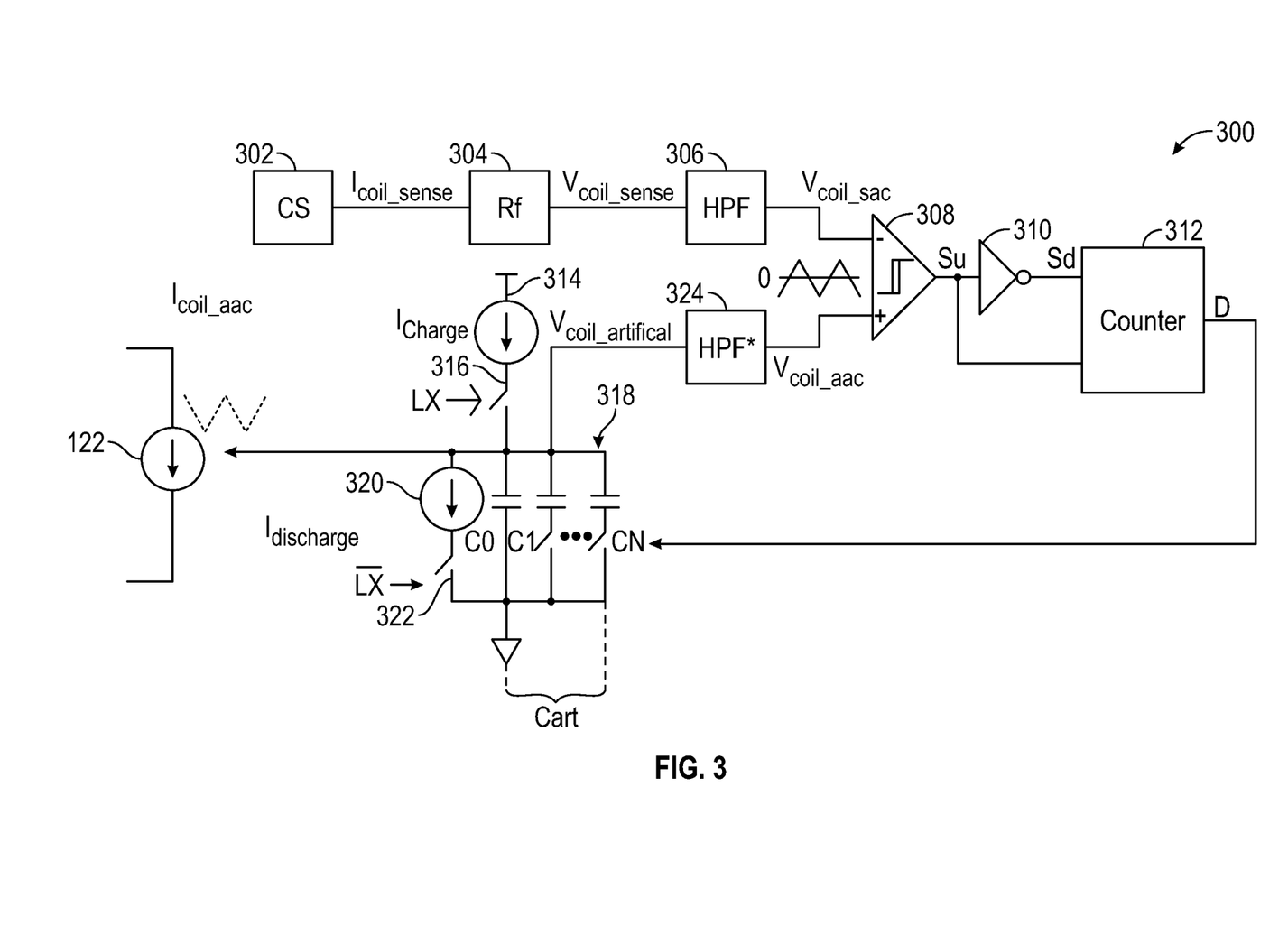
FIG. 3 illustrates example portions of a ripple attenuation circuit.

The artificial coil current may be generated using a closed-loop, self-adaptive coil current ripple cancellation circuit. FIG. 3 illustrates example portions of a ripple attenuation circuit 300. The ripple attenuation circuit 300 may include a current sensor 302 to sense the coil current, Icoil_sense. The sensed coil current, Icoil_sense, may be converted to a sensed coil voltage, Vcoil_sense, using a resistor Rf 304. Vcoil_sense may be filtered using a high pass filter 306 to extract components of corresponding to a range of frequencies, e.g., a high frequency portion of Vcoil_sense (referred to as the AC portion, Vcoil_sac). Vcoil_sac may be applied to an input terminal of a comparator 308.

The ripple attenuation circuit 300 may also include components, as described in more detail below, to generate a corresponding an artificial coil voltage Vcoil_artificial, which is applied to another input terminal of the comparator 308. The output of the comparator 308 (Su) may be coupled to a logic gate 310 (e.g., an inverter) and a counter 312.

To generate the Vcoil_artificial, the ripple attenuation circuit 300 may include a first current source 314, a first switch 316, a capacitance network 318, a second current source 320, and a second switch 322. The first current source 314 may generate a charge current Icharge:

Icharge=α*(Vin−Vout), where α is a scaling factor.

The first current source 314 may be coupled to the first switch 316, which may be controlled by LX (the output of the switching devices 102, 104, as described above). The second current source 320 may generate discharge current Idischarge:

Idischarge=α*Vout, where α is a scaling factor

The second current source 320 may be coupled to the second switch 322, which may be controlled by $\overline{LX}$(a complementary output of the switching devices, as described above). The first and second current sources (314 and 320) may track the coil current Icoil because Icharge is proportional to Vin-Vout and Idischarge is proportional to Vout. The first and second switches (316 and 322), which are controlled by LX and $\overline{LX}$, respectively, may synchronize Vcoil_artificial to Icoil.

Vcoil_artifical may be filtered using a high pass filter 324 to extract components of corresponding to a range of frequencies, e.g., the high frequency portion (referred to as the AC portion, Vcoil_aac). Vcoil_aac may be applied to the other terminal of the comparator 308. The comparator 308 may compare the Vcoil_sac and Vcoil_aac (generating Su). Su may be inverted by logic gate 210 to generate Sd. Both Su and Sd may he applied as inputs to the counter, which may generate a counter output D. Su may increment the counter output while Sd may decrement the counter output. Based on the comparison as represented by counter output, the total capacitance of the capacitor network 318 may be set or modified to adjust Vcoil_artifical.

In this example, the comparison of Vcoil_aac and Vcoil_sac may be determined at the falling edge of LX. If Vcoil_aac>Vcoil_sac, Su pops and D increases, which may lead to increasing the total capacitance Cart in value. If Vcoil_aac<Vcoil_sac, Sd pops and D decreases, which may lead to decreasing the total capacitance Cart in value.

Vcoil_artifical may he reversed (e.g., shifted 180 degrees in phase) and converted to a current Icoil_aac by current source 122, which may then be injected into the output node of the switching regulator 100, as described above. In this example, artificial coil current Icoil_aac may be characterized as:

Icoil_aac=−1*Vcoil_artifical/Rc

Figure 4:
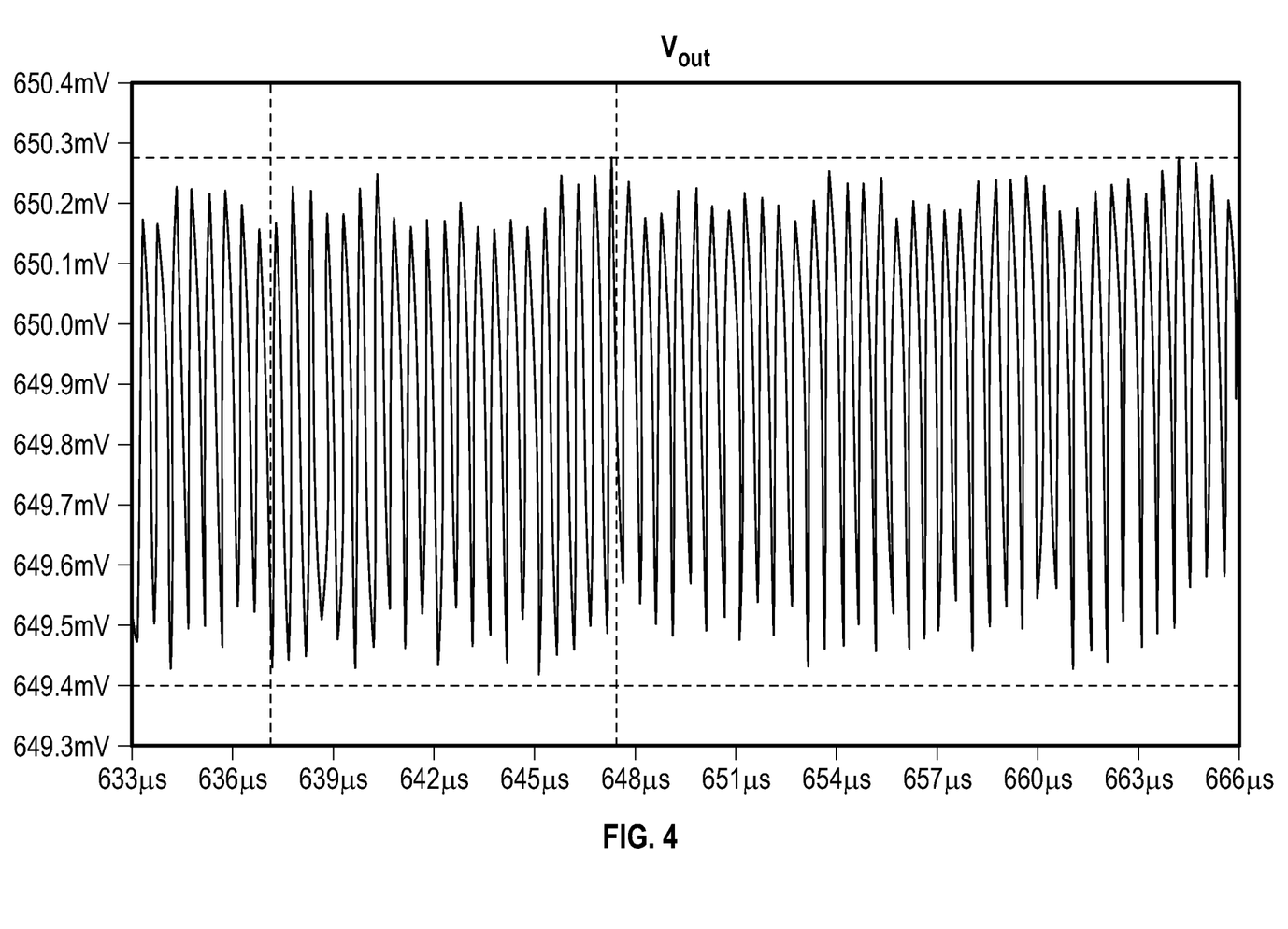
FIG. 4 illustrates a graph of an output with ripple attenuation.
Figure 5:
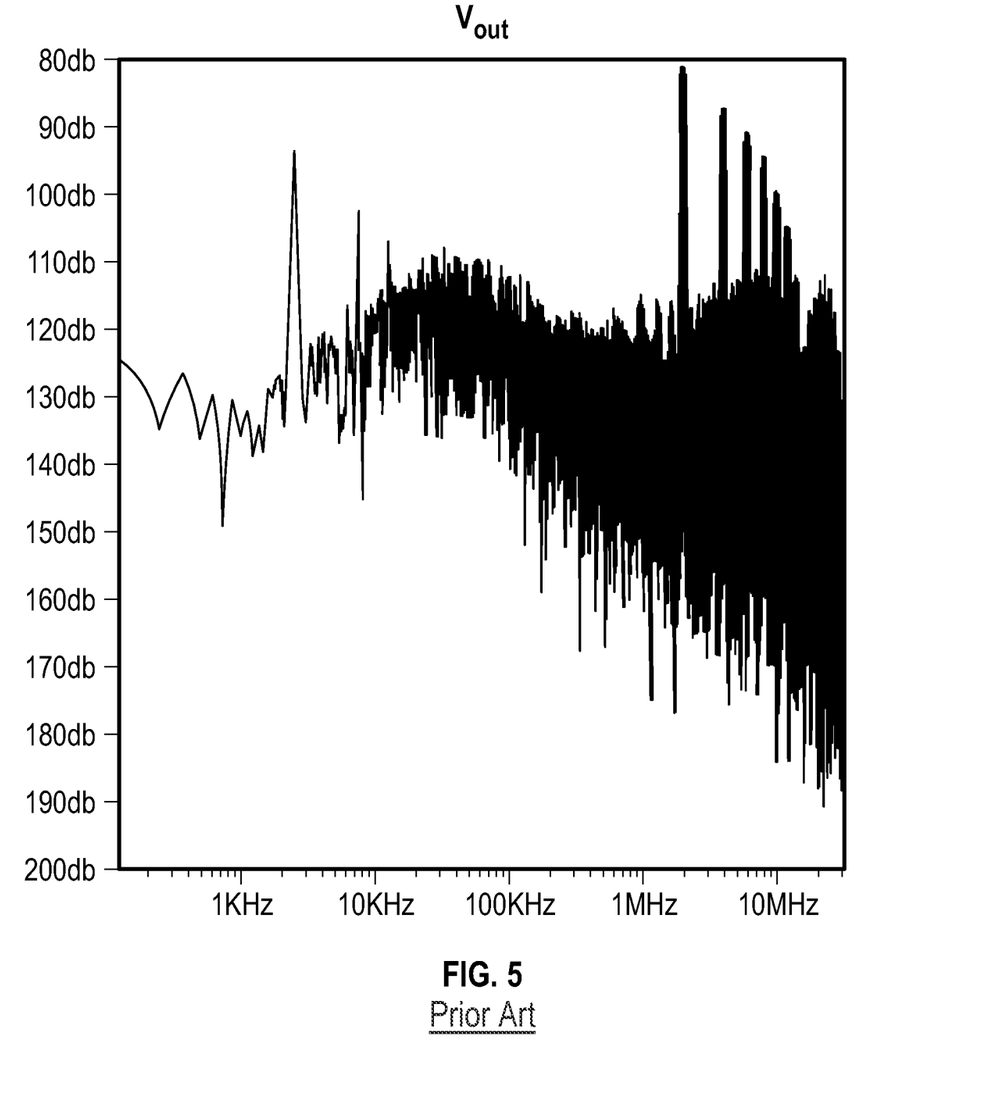
FIG. 5 illustrates a graph of an output without compensation.
Figure 6:
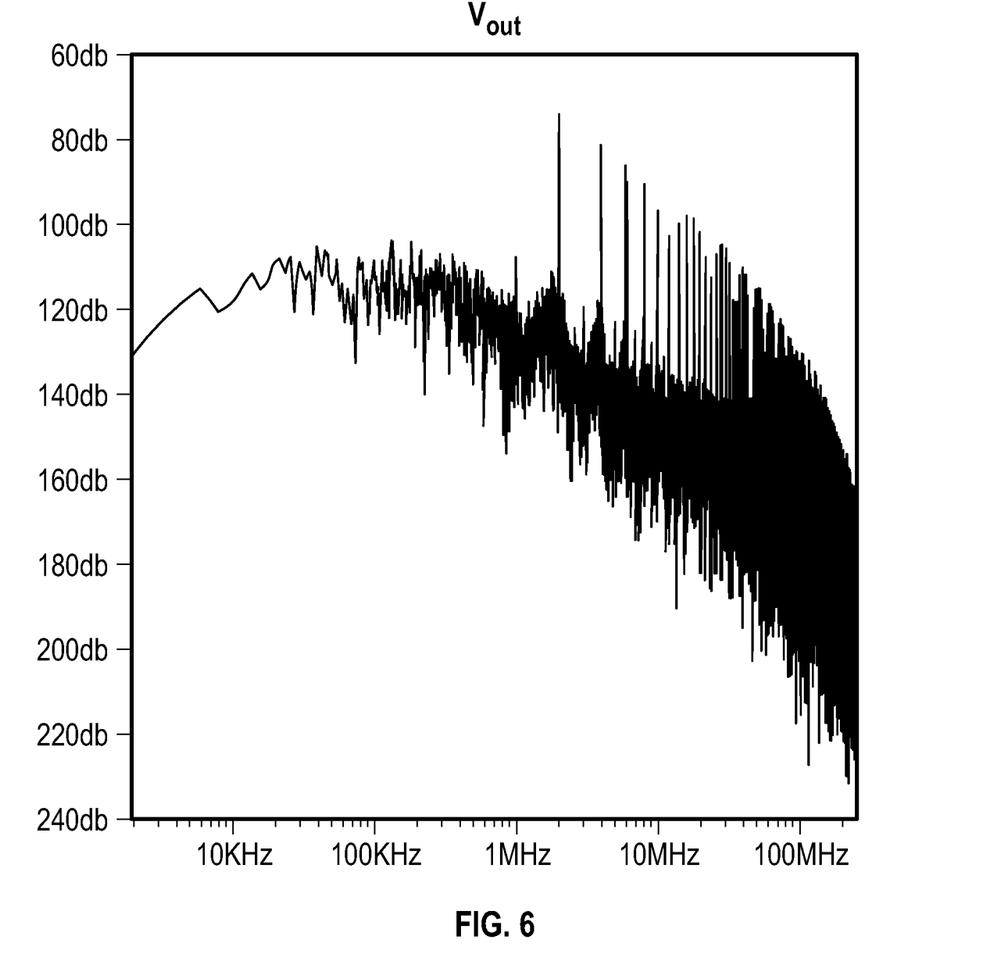
FIG. 6 illustrates a graph of an output with compensation.

FIG. 4 illustrates a graph of $V_{OUT}$ with ripple attenuation, as described herein. As shown, $V_{OUT}$ does not suffer from significant ripples due to the ripple attenuation techniques described herein. To further show the effects of the ripple attenuation techniques described herein compare output voltages with and without compensation. FIG. 5 illustrates the Fast Fourier Transform (FFT) result of $V_{OUT}$ without compensation, and FIG. 6 illustrates the FFT result of $V_{OUT}$ with compensation, as described herein. As shown, the ripples in the output voltage may be attenuated using the techniques described herein. Attenuating the ripples may also reduce of the output voltage without affecting the performance of the switching frequency.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to he illustrative, and not restrictive. For example, the above-described examples (or one or more aspects thereof) may be used in combination with each other. Other implementations can he used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

The invention claimed is:

1. A method for ripple attenuation in a switching regulator, the method comprising:
   sensing a representation of a coil current of the switching regulator;
   converting the sensed representation of the coil current to sensed coil voltage representation;
   generating an artificial coil voltage representation;
   comparing the sensed coil voltage representation and the artificial coil voltage representation;
   based on comparing the sensed coil voltage and the artificial coil voltage representations, adjusting the artificial coil voltage representation;
   converting the adjusted artificial coil voltage representation to an artificial coil current representation; and
   injecting the artificial coil current representation into an output node of the switching regulator.

2. The method of claim 1, further comprising:
   inverting a phase of the adjusted artificial coil voltage.

3. The method of claim 1, filtering the sensed coil voltage and the artificial coil voltage representations to extract components of the voltages corresponding to a range of frequencies.

4. The method of claim 1, wherein adjusting the artificial coil voltage representation includes adjusting a capacitance value.

5. The method of claim 1, wherein generating the artificial coil voltage includes:
   generating a charging current representation;
   generating a discharging current representation; and
   combining the charging and discharging current representations by synchronizing to the coil current to generate a combined current representation.

6. The method of claim 5, wherein the charging current is proportional to a difference of an input voltage and an output voltage of the switching regulator.

7. The method of claim 5, wherein the discharging current is proportional an output voltage.

8. The method of claim 5, further comprising:
   converting the combined current representation to the artificial coil voltage representation using a capacitance network.

9. A ripple attenuation circuit, comprising:
   a current sensor to sense a coil current in a switching regulator;
   a first converter to convert the coil current to a coil voltage;
   a voltage generator to generate an artificial coil voltage;
   a comparator to compare the coil voltage and the artificial coil voltage;
   wherein the voltage generator is configured to adjust the artificial coil voltage based on comparing the coil voltage and the artificial coil voltage; and
   a second converter to convert the adjusted artificial coil voltage to an artificial coil current.

10. The circuit of claim 9, wherein the artificial coil current is injected into an output node of the switching regulator.

11. The circuit of claim 9, further comprising:
    a pair of high pass filters to filter the coil voltage and artificial coil voltage, respectively.

12. The circuit of claim 9, wherein the voltage generator includes:
a first current source to generate a charging current;
a second current source to generate a discharging current;
a capacitance network to convert the charging and discharging currents to the artificial coil voltage, wherein the artificial coil voltage is synchronized to the coil current.

13. The circuit of claim 12, wherein the charging current is proportional to a difference of an input voltage and an output voltage of the switching regulator.

14. The circuit of claim 12, wherein the discharging current is proportional an output voltage.

15. The circuit of claim 12, wherein adjusting the artificial coil voltage includes adjusting a capacitance value of the capacitance network.

16. A switching regulator comprising:
a switching converter to convert an input voltage to an output voltage at an output node, the switching converter including a pair of switching devices and an inductor; and
a ripple attenuation circuit coupled to the switching converter to inject an artificial coil current into the output node, the ripple attenuation circuit comprising:
a current sensor to sense a coil current in the inductor of the switching converter;
a voltage converter to convert the coil current to a coil voltage;
a signal generator to generate an artificial coil voltage;
a comparator to compare the coil voltage and the artificial coil voltage, wherein based on comparing the coil voltage and the artificial voltage, the signal generator is configured to adjust the artificial coil voltage wherein based on comparing the coil voltage and the artificial coil voltage; and
a current converter to convert the adjusted artificial coil voltage to the artificial coil current.

17. The switching regulator of claim 16, further comprising:
a pair of high pass filters to filter the coil voltage and artificial coil voltage, respectively.

18. The switching regulator of claim 16, wherein the signal generator includes:
a first current source to generate a charging current;
a second current source to generate a discharging current;
a capacitance network to convert the charging and discharging currents to the artificial coil voltage, wherein the artificial coil voltage is synchronized to the coil current.

19. The switching regulator of claim 18, wherein the charging current is proportional to a difference of an input voltage and the output voltage of the switching regulator and wherein the discharging current is proportional the output voltage.

20. The switching regulator of claim 18, wherein adjusting the artificial coil voltage includes adjusting a capacitance value of the capacitance network.

* * * * *